(12) United States Patent
Hatanaka et al.

(10) Patent No.: US 6,848,614 B2
(45) Date of Patent: Feb. 1, 2005

(54) AUTOMATIC TRANSACTION MACHINE

(75) Inventors: Yumi Hatanaka, Owariasahi (JP); Shingo Hatanaka, Owariasahi (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 10/386,108

(22) Filed: Mar. 12, 2003

(65) Prior Publication Data

US 2004/0004116 A1 Jan. 8, 2004

(30) Foreign Application Priority Data

Mar. 25, 2002 (JP) ........................................ 2002-083845

(51) Int. Cl.[7] .............................................. G06F 17/60
(52) U.S. Cl. ....................................................... 235/379
(58) Field of Search ................................. 235/379, 380

(56) References Cited

U.S. PATENT DOCUMENTS

| 6,047,269 A | * | 4/2000 | Biffar ......................... 705/39 |
| 6,070,794 A | * | 6/2000 | Niwata et al. ............... 235/380 |
| 6,129,274 A | * | 10/2000 | Suzuki ........................ 235/381 |
| 6,182,891 B1 | * | 2/2001 | Furuhashi et al. ........... 235/379 |
| 6,305,603 B1 | * | 10/2001 | Grunbok et al. ............ 235/379 |
| 2001/0032878 A1 | * | 10/2001 | Tsiounis et al. ............. 235/379 |
| 2002/0166892 A1 | * | 11/2002 | Morooka et al. ........... 235/379 |

FOREIGN PATENT DOCUMENTS

JP          11-110608          4/1999

* cited by examiner

Primary Examiner—Mark Tremblay
(74) Attorney, Agent, or Firm—McDermott Will & Emery LLP (57) ABSTRACT

The purpose of the present invention is to simplify the operation of an automatic transaction machine and to improve the convenience therein. In the automatic transaction machine, a transaction history of more than one account is managed together for every one user and is presented as a transaction menu. The transaction history is recorded in an IC card. A user can edit the transaction history selected as a transaction details in an arbitrary manner. By presenting the transaction history as a transaction menu, the machine can provide the user with a rapid and simple transaction.

9 Claims, 9 Drawing Sheets

| Date | Account | Type |
|---|---|---|
| 02/02/20 | C | Deposit |
| 02/01/25 | B | Withdrawal |
| 02/01/18 | B | Transfer |
| 02/01/10 | A | Deposit |
| 02/01/05 | B | Deposit |
| 01/11/29 | C | Withdrawal |

Fig.9

AUTOMATIC TRANSACTION MACHINE

BACKGROUND OF THE INVENTION

The present invention relates to an automatic transaction machine that conducts card-using transactions.

In places such as financial institutions, automatic transaction machines are used to make deposits and withdrawals for users. Cards such as credit cards, debit cards, and cash cards are used for these transactions. Recently, cards mounted with contact or non-contact IC chips and magnetic strips (simply referred to as "IC cards" hereinafter) are becoming commonplace. Some of the cards also mount both the contact and the non-contact IC chips. Since data storage capability of IC chips is larger than that of magnetic strips, IC chips afford to store account information. Accordingly, a user needs only one card to conduct different transactions on different accounts. Also proposed is the use of the IC card as an electronic passbook that records a deposits and withdrawals history.

In order to improve the convenience in the automatic transaction machine, various techniques have been proposed to simplify user operations. An example of such techniques is to use a transfer card that has target account and transfer amounts recorded therein. The transfer card is non-rewritable but can record those information added to the old information recorded therein. User do not have to input target account information and transfer amounts by using the transfer card, thereby avoiding input errors for transfer transaction. Another proposed type of automatic transaction machine conducts transactions by using a transaction history (e.g., JP11-110608A). The technique displays the transaction history on a display and executes a transaction selected there from.

SUMMARY OF THE INVENTION

The transfer card, however, is inconvenient in that it must be used with a cash card. Furthermore, in the technique using the transaction history, the transfer amount cannot be changed even if a different amount of transfer is desired to the same target account, which made the transactions inflexible.

In consideration of above-described matter, there is a possibility for the conventional automatic transaction machines to simplify user operations and to improve their convenience. The simplified operations are particularly desirable in transactions using IC cards. This is because a single IC card can handle plural transactions on more then one account and thus needs an additional operation to select an account. In view of such a problem, the present invention addresses to simplify operations in an automatic transaction machine thereby improving its convenience.

In order to solve at least a part of the above-mentioned problem, a first configuration of the present invention relates to an automatic transaction machine that comprises a history input module, a presentation module, and a transaction execution module.

The history input module inputs a transaction history that covers more than one account associated with a user. The transaction history not necessarily includes all transaction details, but may include the account and the type of each transaction at least.

The presentation module presents transaction menus, operation guidance, and such. The transaction history may be presented in the following manners: in parallel with a normal transaction menu; presented by itself. In the case where the transaction history is included in the transaction menus, the menu preferably includes designations of a target account and a type of each transaction to present the transaction history. Alternatively, there may be a menu for selecting whether or not the transaction history needs to be presented.

The transaction execution module executes a selected transaction. When a transaction is selected out of the transaction history, the transaction execution module executes the designated type of the transaction to the designated account. The term "transaction" includes the entire transaction procedures regarding to the information input by the user, including followings: a withdrawal from the account; a deposit into the account; a transfer from the account to another; and an entry of the transaction.

According to the first configuration of the present invention, a past transaction history that covers more than one account can be checked all at once. Additionally, using the transaction history as a transaction menu can simplify designations of an account and a type of each transaction at the time a transaction is conducted. This improves the convenience in transactions that use more than one account.

In the first configuration, although input account information for which the transaction histories are displayed may be input one by one for more than one account, the information is preferably input from an IC card with record of the account information for more than one account. This facilitates the input of the account information of more than one account and further improves the convenience. A password for authentication may or may not be needed.

In the first configuration, if the automatic transaction machine connects with an account-managing host computer via a communication line, the machine may obtain the transaction history through the communication with the host computer. Accordingly, any one of the many transaction histories recorded in the host computer can be effectively used as a transaction menu.

Alternatively, the automatic transaction machine may present a transaction history recorded in an IC card that is to be inserted, at the time of conducting a transaction. This eliminates the communication with the host computer for presenting the transaction history, thereby shortening the required time-period to present the information.

The IC card may record the transactions conducted on more than one account as a transaction history. The automatic transaction machine preferably presents at least the card-using transactions conducted by using the card as a transaction menu. The transactions generally include two types of transactions: conducted by the user itself by using the card, such as deposits and withdrawals; and transactions independent of user operations, such as charges and transfers from others. The IC card can record both types of the transactions therein. This allows the user using the card as a so-called electronic passbook, and a part of the information can be effectively used as a transaction menu of the present invention.

A second configuration of the present invention relates to an automatic transaction machine that executes transactions based on operations by a user, comprising a history input module, a presentation module, an edit instruction module, and a transaction execution module.

The items required for a transaction may vary according to the type of each transaction. The essential items of a deposit transaction, for example, at least include the amount to deposit.

According to the second configuration, a user can edit a transaction history to use it for various transactions. In other words, the user can still make effective use of the transaction history even if a part of information required to a transaction, such as an amount, differs from the information recorded in the transaction history.

In the second configuration, the automatic transaction machine may make all the transaction history information user-editable. Alternatively, the machine may present the transaction history with some of the items left in blanks, so that the user can fill them. Alternatively, the user may designate whether or not the editing is necessary. In the latter case, the designation of the necessity of the editing and the selection from the transaction history may be in this order or may be reversed.

A third configuration of the present invention relates to an automatic transaction machine that comprises a transaction execution module and a history output module. The third configuration uses a history retention module that retains a transaction history covering more than one account associated with a user. The history output module outputs to the history retention means at least a part of the information designated for each transaction. The output desirably includes at least the information about accounts targeted for each transaction.

The history retention means may be a host computer, or may preferably be a portable recording medium. The medium records the transaction history within a predetermined amount, such as history for past n transactions (n is a natural number), which is less than an acceptable capacity of the medium. The portable recording medium may be, for example, a light and small medium such as an IC chip. Alternatively, a portable terminal such as a cell phone or a PDA may be used to retain the transaction history.

According to the third configuration, the user can integrally manage the transaction history that covers more than one account. Presenting the transaction history as a transaction menu in the third configuration can make operations for a transaction easier and provide rapid services.

The history output module preferably makes an output in the case where the transaction does not overlap with any of the transaction history that is already recorded in the history retention module. The term "overlap" refers to a case, e.g., where at least one of the type and the account of the executed transaction does not match with any of the recorded transaction history.

Determining the possibility of the overlap and omitting a part of the transaction details to be recorded, the configuration can effectively use the recording area, thereby recording a great number of transactions as a history.

In the third configuration, the history retention module may be configured as an electric passbook that records all of the past n transactions regardless of the possibility of the overlap.

The present invention may also combine the first, second, and the third configuration described above, as appropriate, to configure an integrated automatic transaction machine.

In the present invention, the transaction history is recorded in a portable recording medium or a host computer and managed therein. An electronic passbook, which records the transactions on more than one account entirely, may use as the portable recording medium.

The present invention is not restricted to the automatic transaction machines described above, but may also be configurable into various other embodiments. Displaying a past history as a transaction menu, for example, is widely applicable to various transactions: online shopping; online banking; and online trading that are conducted by connecting personal computers and a host computer via given communication lines. Additionally, the term "transactions" not only refer to money-related behaviors such as making deposits, withdrawals, or transfers, but may also refer to administrative procedures such as obtaining certificates of residence at administrative bodies.

The present invention is not restricted to an automatic transaction machine, but is also configurable into various aspects. For example, the present invention is configurable as a method of controlling an automatic transaction machine that implements the transactions described above. The present invention is also configurable as a computer program for implementing such a control, or a computer-readable recording medium recorded with such a computer program. Various types of media may be used for the recording medium, including a flexible disk, a CD-ROM, a magnet optical disk, an IC card, a ROM cartridge, a punch card, a printed material printed with codes such as bar codes, and a computer-readable medium such as an internal storage (a memory such as a RAM or a ROM) and an external storage.

DESCRIPTION OF THE EMBODIMENTS

Figure 1:
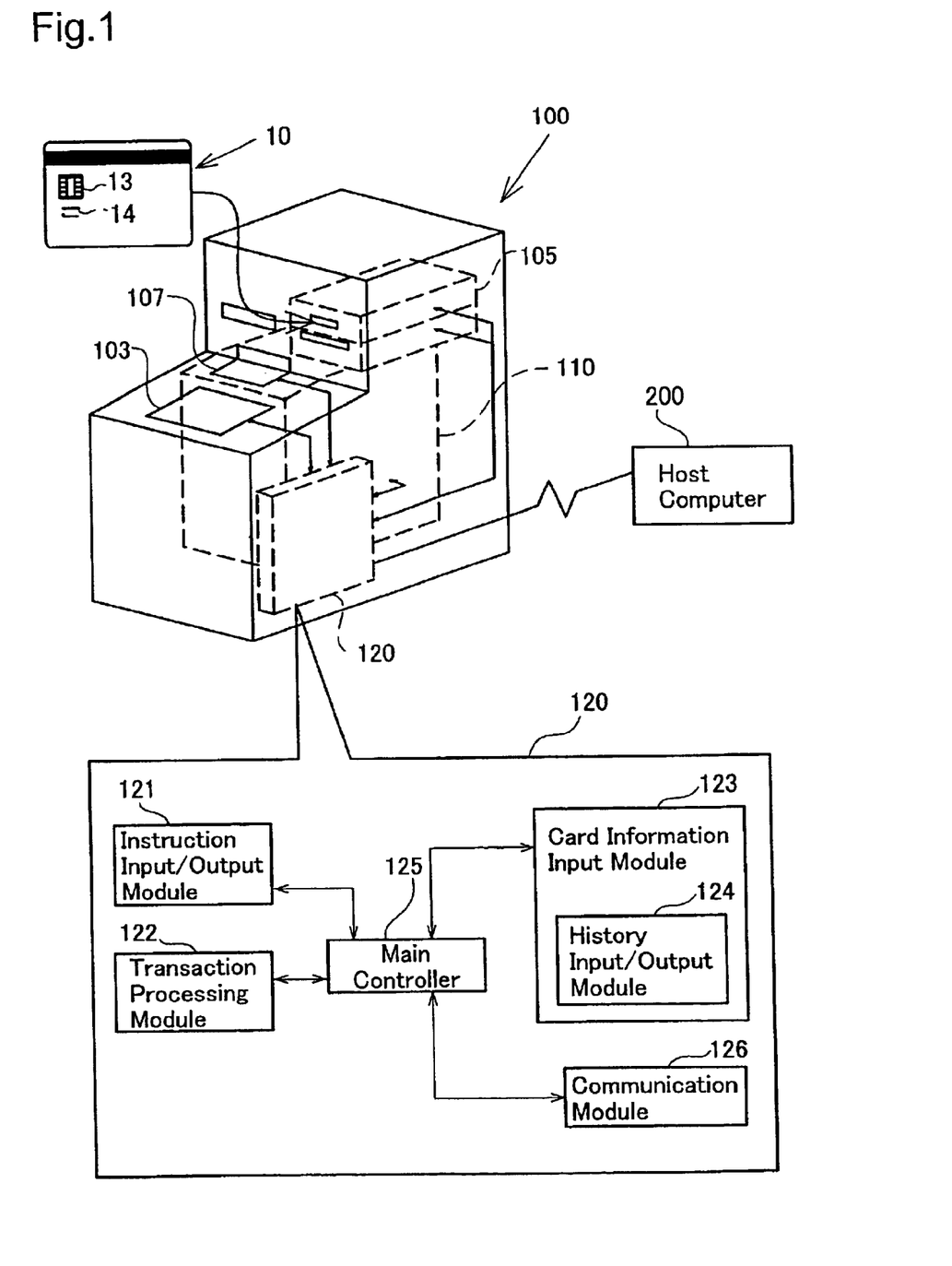
FIG. 1 is a schematic that shows the general configuration of an automatic transaction machine.

Preferred embodiments of the present invention will be described under the following sections:

A. First Embodiment
   A1. System Configuration
   A2. Management of Histories
   A3. Processing of Transactions
   A4. Display of Transaction Menu
   A5. Processing of Transaction Information Input
   A6. Display of Edit Window
   A7. Processing of Recording
B. Second Embodiment
   B1. Mode of Recording
C. Modification A. First Embodiment
   A1. System Configuration
FIG. 1 is a schematic that shows the general configuration of an automatic transaction machine as an embodiment. The automatic transaction machine is placed in a financial institution such as a bank, and provides unattended services of deposits and withdrawals according to operations by a user. The processing of deposits and withdrawals include various types of processing: a deposit to the user's account; a withdrawal from the account; and a transfer from the account to another. Although the following embodiment describes the automatic transaction machine that processes deposits and withdrawals, the automatic transaction machine of the embodiment may also make transactions other than deposits and withdrawals, such as the issuing of certificates at public institutions, for example.

An automatic transaction machine (referred to as an ATM herein after) 100 of the embodiment deals with a card 10 mounted with IC chips (referred to as an IC card herein after). The IC card 10 is illustrated in FIG. 1. The card 10 is mounted with a contact IC chip 13 and a non-contact IC chip 14.

The ATM 100 is equipped with following units that are arranged as shown. A card handling mechanism 105 functions to read information recorded in the chips 13 and 14 of the IC card 10. The information recorded in the card includes, for example, account numbers, i.e. the account-designating information for specifying the account of each customer, and passwords. The account-designating information for more than one account is recorded in the chips.

An operation module 103 is an interface to display the information for the deposit and the withdrawal transactions and to input the operations for making the deposits and withdrawals. Although a touch panel is employed in the present embodiment, other configurations are also possible, such as the combination of a display and a push-button switch.

Users give or receive bills to or from the ATM through a deposit and withdrawal opening 107. An embedded bill-handling machine 110 discriminates the bills that are inserted into the opening 107, and classifies and stores them according to their denominations. At the time of making a withdrawal, the bill-handling machine 110 prepares bills corresponding to a designated amount by a user and delivers them to the opening 107.

The configuration of the ATM 100 is not restricted to the illustrated one, but may be equipped with various other units, too. The following units are applicable in addition to the units described above: a unit for handling passbooks, a unit for handling statements, or a unit for audio assisting.

The operation of each unit of the ATM 100 is controlled by a control unit 120. The control unit 120 is configured as a microcomputer with CPU and memory therein. The control unit 120 gives and receives the information to and from each unit, as indicated by arrows, thereby controlling the entire operations of the ATM 100. The ATM 100 connects with a host computer 200 of a financial institution via a communication line. The control unit 120 communicates with the host computer 200, as appropriate, to conduct the processing of deposits and withdrawals.

FIG. 1 also shows the functional blocks of the control unit 120 that are associated with the processing of transactions. In the present embodiment, each functional block is configured by software within the control unit 120 and is controlled by a main control module 125. Alternatively, each functional block may also be configured with a hardware.

A card information input module 123 controls the card handling mechanism 105 to receive the information from the IC chips. A history input/output module 124 is configured as a part of the card information input module 123, and inputs and the outputs the transaction history information. The information input from the card are passed to a transaction processing module 122, which controls the entire processing of transactions, via the main control module 125.

An instruction input/output module 121 controls the operation module 103 to display a menu or other windows for user operations and to input the operation results. The instruction input/output module 121 also functions to display a guidance of operations to make the transaction history function as a transaction menu: how to display the transaction history; or how to edit the transaction history.

The information input from the instruction input/output module 121 is passed to the transaction processing module 122 via the main control module 125. The transaction processing module 122 sends the information to the host computer 200 via a communication module 126, as appropriate, to conduct the processing of transactions. If the transaction involves the receipt or the payment of cash money, the transaction processing module 122 controls the bill-handling machine 110 to receive or pay the cash.

The processing of transactions of the present invention not necessarily involves the receipt or the payment of cash money, but may also involve transactions only transmitting amount information without handling bills, such as a transfer from the user's account to another.

A2. Management of Histories

Figure 2:
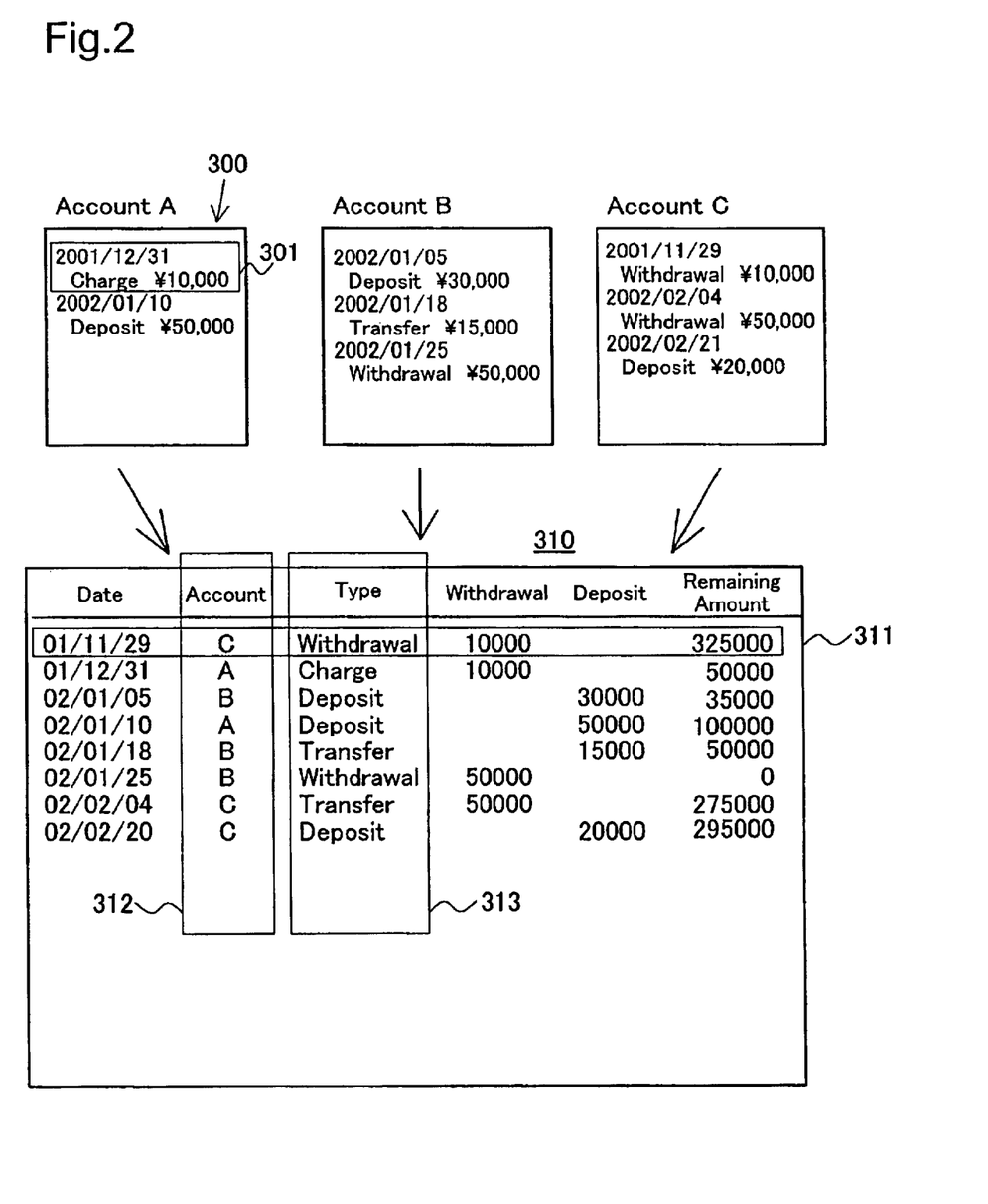
FIG. 2 is a schematic that shows an example of the management of transaction histories.

FIG. 2 is a schematic that shows an example of the management of transaction histories. As described above, the IC card 10 records the account information of more than one account. In this embodiment, the IC card 10 is executable of transactions for accounts A, B, and C. The upper part of FIG. 2 depicts information that the host computer 200 manages account by account as transaction histories. If the accounts A, B, and C are of different financial institutions one other, the information for the accounts may be recorded in different host computers one another. The transaction history 300 corresponds to the account A, and records all of the transactions related to the account. The accounts B and C also record the similar information, respectively.

A composite transaction history 310 is integrally recording the transaction histories 300 for more than one account, and is recorded in the IC card 10. Transaction information 311 includes various items: a date, a target account, a transaction type, an amount of withdrawal, deposit, amount outstanding, and such. The history 310 integrally records information over more than one account in a following manner: recording every account used for transactions to the item of account 312; and recording every type of transactions to the item of type 313 regardless of the use of the IC card. In the present embodiment, the history 310 is recorded in an ascending order of dates as an electronic passbook, and it may be recorded in any order, such as in a descending order of dates. Alternatively, the composite transaction history 310 may be stored in a host computer.

A3. Processing of Transaction

Figure 3:
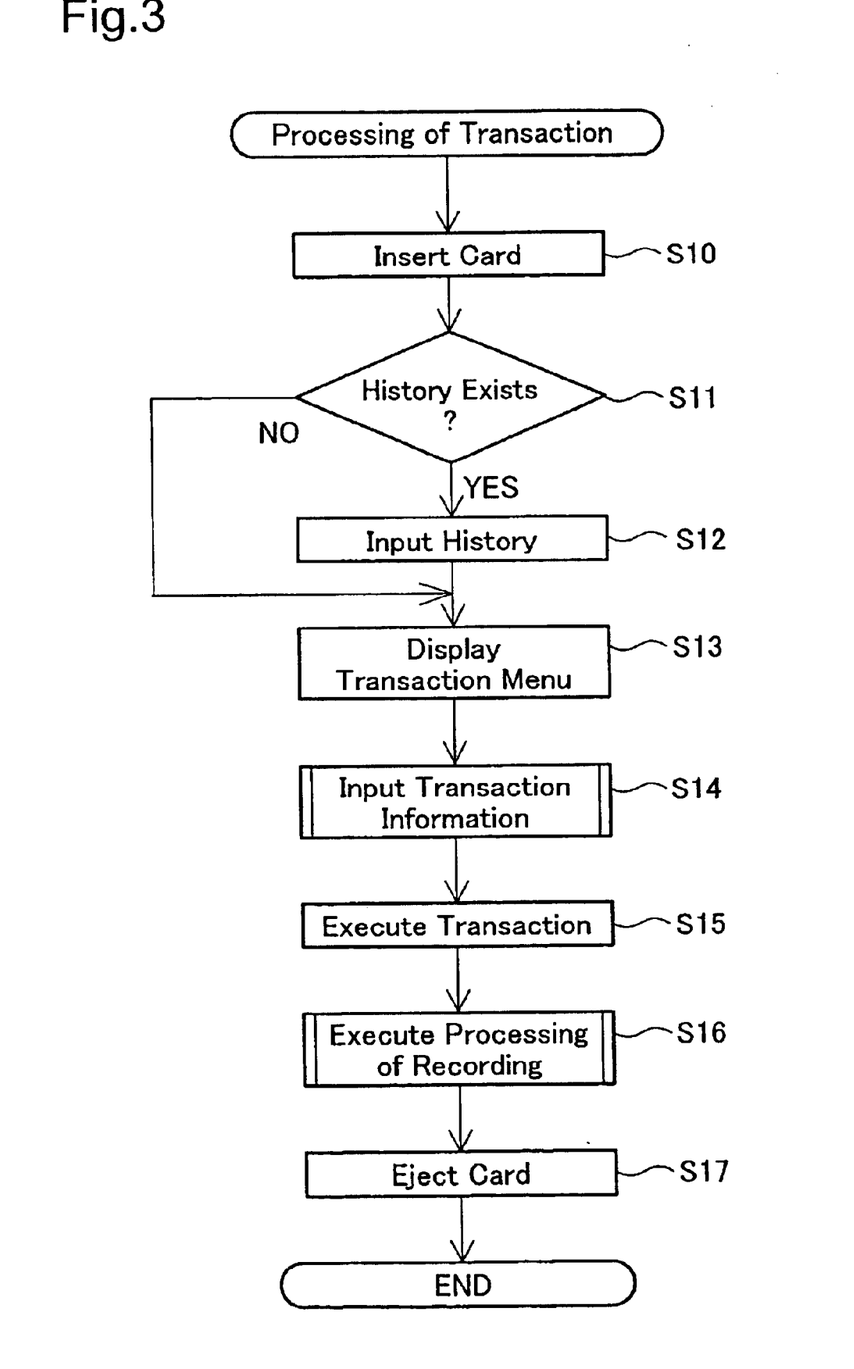
FIG. 3 is a flowchart of the processing of transactions.

FIG. 3 is a flowchart of the processing of transactions. The processing is executed by the control unit 120 and it includes following steps: displaying a transaction menu based on the transaction history recorded in the card information; carrying out the transaction that the user selects according to the transaction menu. The processing starts when a user inserts the IC card 10 into the card handling mechanism 105 of the ATM 100.

The processing being started, the control unit 120 reads account information, e.g., account numbers currently retained by the user, from the IC card (step S10). The control unit 120 then determines the presence of a transaction history in the IC card (step S12). If a transaction history exists, the control unit 120 input the history into the history input/output module 124 (step S12). If no transaction history exists, the step is skipped. After inputting the history, the control unit 120 displays the history as a transaction menu (step S13). If any other transaction history is input already, the control unit 120 displays both the histories as a transaction menu.

The control unit 120 then inputs transaction information (step S14) to execute the transaction (step S15). The transaction information, which varies according to the type of the transaction selected by the user, may include the result of the selection of transaction history and an amount of the transaction. In the processing, the control unit 120 sends the information input in previous steps to the host computer 200, as appropriate, thereby executing the processing. In this process, the transaction details is associated with the account and recorded in the host computer 200 as a history.

The control unit 120 records the transaction details into the IC card (step S16). When the processing is completed, the control unit 120 ejects the IC card 10 (step S17) and ends the processing.

A password may be required for the process of reading and/or writing the card information to ensure proper security. The password may be required in various manners: required for every account to which the transaction is performed; or required only when the user desires to execute the transaction after the transaction menu and all other previous screens are displayed without the password.

In the present embodiment, alternatively, the input card information may be sent to the host computer 200 to obtain a transaction history managed by the host computer.

A4. Display of Transaction Menu

The following describes a transaction menu window in the case of a transaction history exist (Step 13 in FIG. 3).

Figure 4:
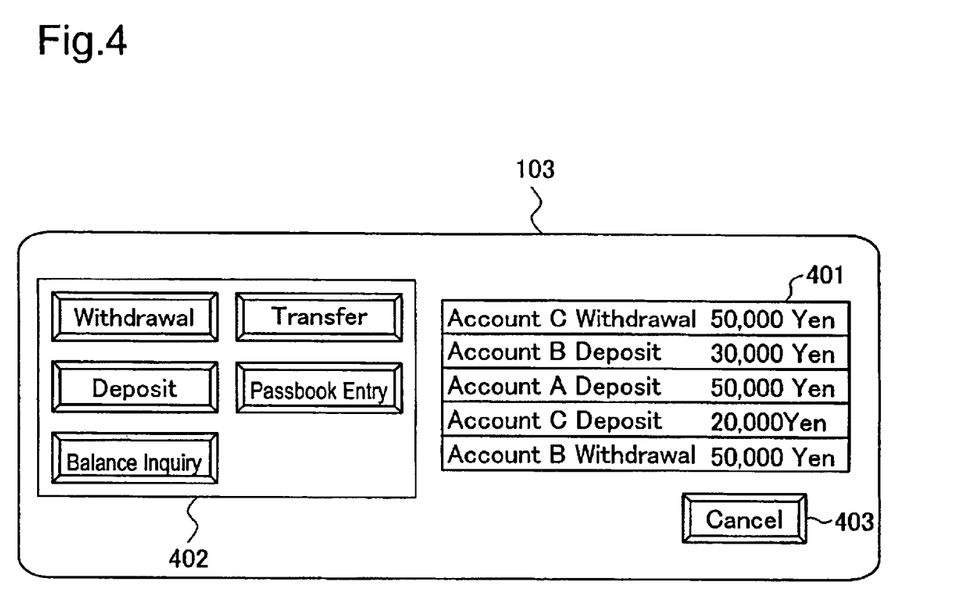
FIG. 4 is a schematic that shows an example of a transaction menu.

FIG. 4 is a schematic that shows an example of a transaction menu. The transaction menu is displayed in the case of a transaction history exists. In this example, the operation module 103 displays a transaction history menu 401, a general transaction menu 402, and a cancel button 403. The cancel button 403 is used to cancel transactions. The transaction history menu 401 displays card-using transactions out of the transaction history 310 recorded in the IC chips. Charges, for example, are not displayed on the transaction history menu 401. The normal transaction menu 402 displays transactions conducted without using the transaction history. The normal transaction menu displays following items: "Withdrawal", "Deposit", "Balance Inquiry", "Transfer", and "Passbook Entry". The items of the normal transaction menu 402 are not restricted to the above five items, but may also include other items such as "Fixed Deposit". Alternatively, as for an ATM dedicated for deposits and withdrawals, the normal transaction menu 402 may display two items only, i.e., "Withdrawal" and "Deposit". The transaction history menu 401 is not necessarily displayed as a list, but may also be displayed as individual buttons as the normal transaction menu 402 is, or may be sorted and displayed by every account or type of transactions. Although the normal transaction menu 402 and the transaction history menu 401 are displayed together in the above example, other configurations are also possible, e.g., the initial window may include a button instead of the transaction history menu 401, so that the user can select the button to display a screen that shows the list of the transaction history.

A5. Processing of Transaction Information Input

Figure 5:
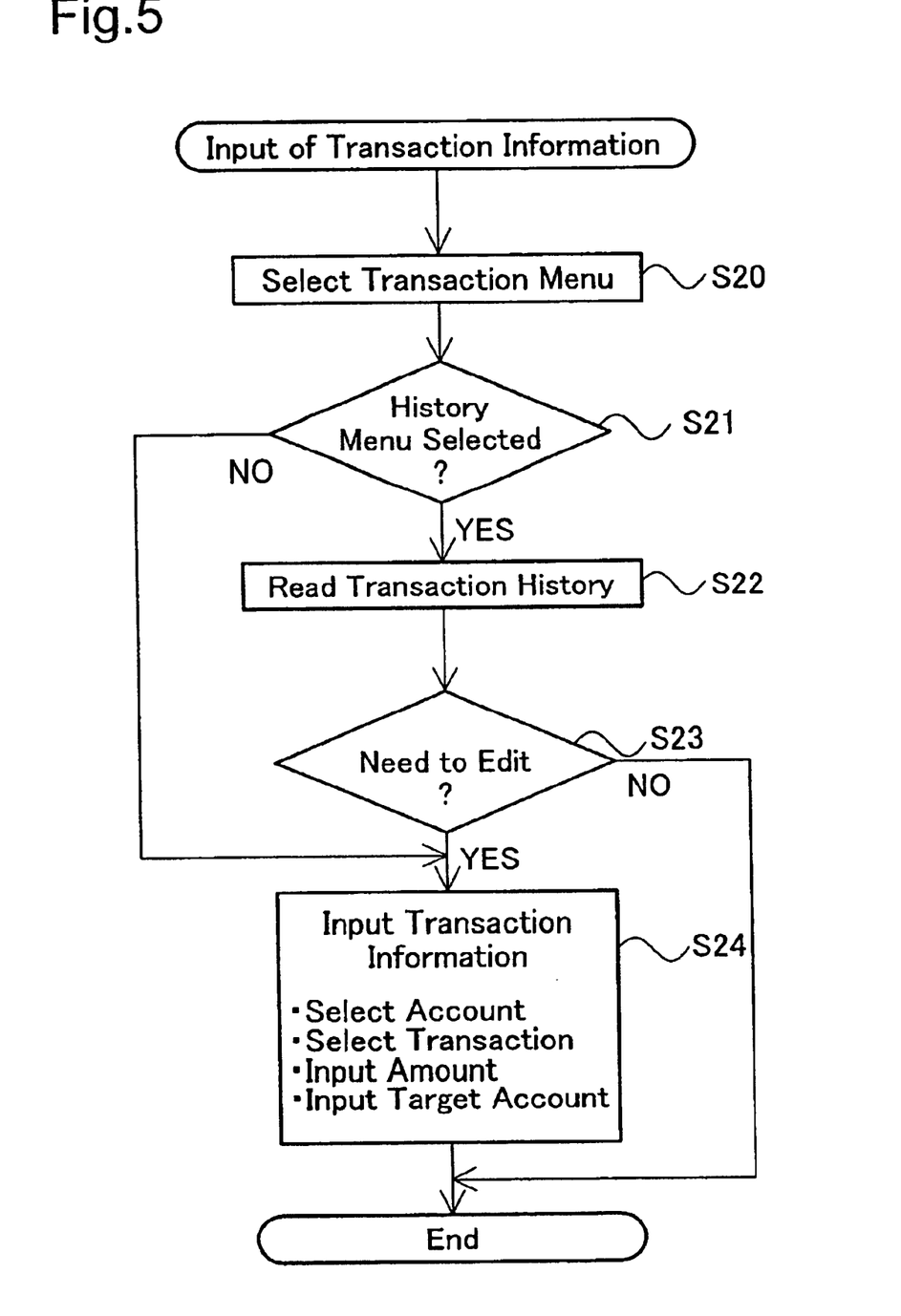
FIG. 5 is a flowchart of the processing of transaction information input.

FIG. 5 is a flowchart showing the processing of transaction information input. The processing is to input and edit transaction information in the process of conducting a transaction that is selected from the transaction menu by a user, and is executed by the control unit 120. The processing starts when the user selects an item from the transaction menu on the operation module 103 of the ATM 100.

When the processing is started, the control unit 120 inputs the item selected from the transaction menu by the user (step S20). The control unit 120 then determines whether or not the selected menu item is included in the transaction history menu 401 (step S21). If the selected menu item is included in the transaction history menu 401, the control unit 120 then reads the transaction history from the transaction history input/output module (step S22), and determines whether or not the details of the transaction history needs to be edited (step S23). If the selected menu item is not included in the transaction history, these steps are skipped and the processing proceeds to the input operation of the transaction information (step S24).

If the details of the transaction history needs to be edited, the control unit 120 inputs transaction information (step S24) and ends the processing. If there is no need of editing, the step is skipped and the processing is ended.

The transaction information to be input includes, for example, the selection of an account, the selection of a transaction, the input of an amount, and the input of a transfer target. Selecting an item from the transaction history menu 401 can eliminate at least operations to select an account and a transaction.

A6. Display of Edit Window

The following describes a display of edit window in the case of the transaction history needs to be edited (step S24).

Figure 6A:
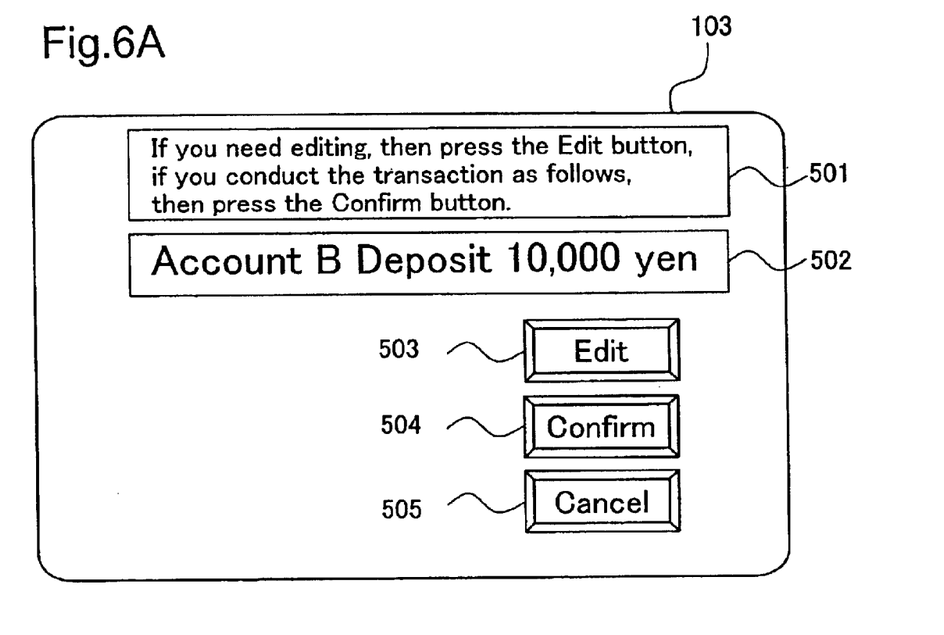
FIGS. 6A and 6B are schematics that show an example of a screen for transaction information input.

FIG. 6A is a schematic that shows an example of a window to input transaction information. It illustrates the edit window that is displayed when a transaction history item is selected out of the transaction menus. In this example, the operation module 103 displays a description indication 501, a transaction details indication 502, an edit button 503, a confirm button 504, and a cancel button 505. The transaction details indication 502 indicates the items required to execute the transaction of the transaction history item selected from the transaction menu. The edit button 503 is used to edit the details on the transaction details indication 502. The confirm button 504 is used to conduct the transaction with the details indicated on the transaction details indication 502. The cancel button 505 is used to cancel the transaction. The edit button 503 is not necessarily displayed. Alternatively, the editing may be conducted by selecting an item to be edited directly in the transaction details indication 502. For example, if the "Deposit" on the transaction details indication 502 needs to be edited into "Withdrawal", the "Deposit" may be selected to display the candidates of other transaction types.

Figure 6B:
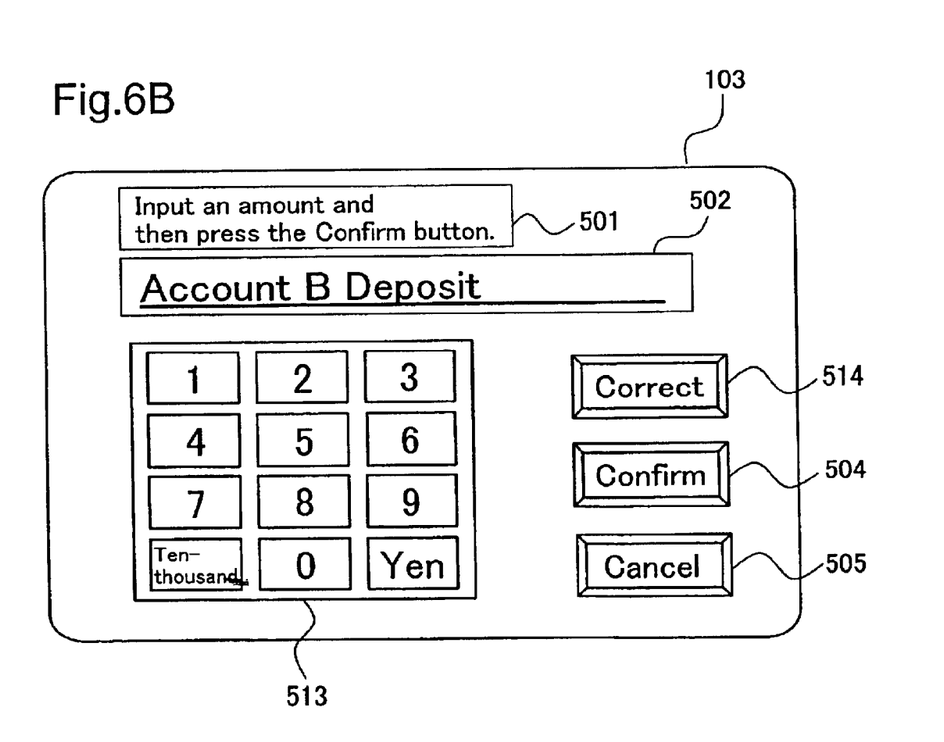

In response to the selection of the edit button 503 on FIG. 6A, the window shown in FIG. 6B is displayed. The amount region on the transaction details indication 502 is left in blank, since the amount is set to be editable in the present example. At this time, a transaction details input 510 to input an amount is displayed together. The description indication 501 then indicates a description to prompt the input of an amount. A correct button 511 is used to correct the details input from the transaction details input 510. The confirm button 504 is used to conduct the transaction with the details indicated on the transaction details indication 502. The cancel button 505 is used to cancel the transaction. The user uses these buttons to designate the amount of the transaction. The user then selects the confirm button 504 to execute the transaction with the specified details (Step S15 in FIG. 3).

Although the description indication 501 provides a display prompt in this embodiment, other types of prompts are also possible, such as a graphical prompt using a static image or a moving image, a vice prompt, or the combination thereof.

A7. Processing of Recording

Figure 7:
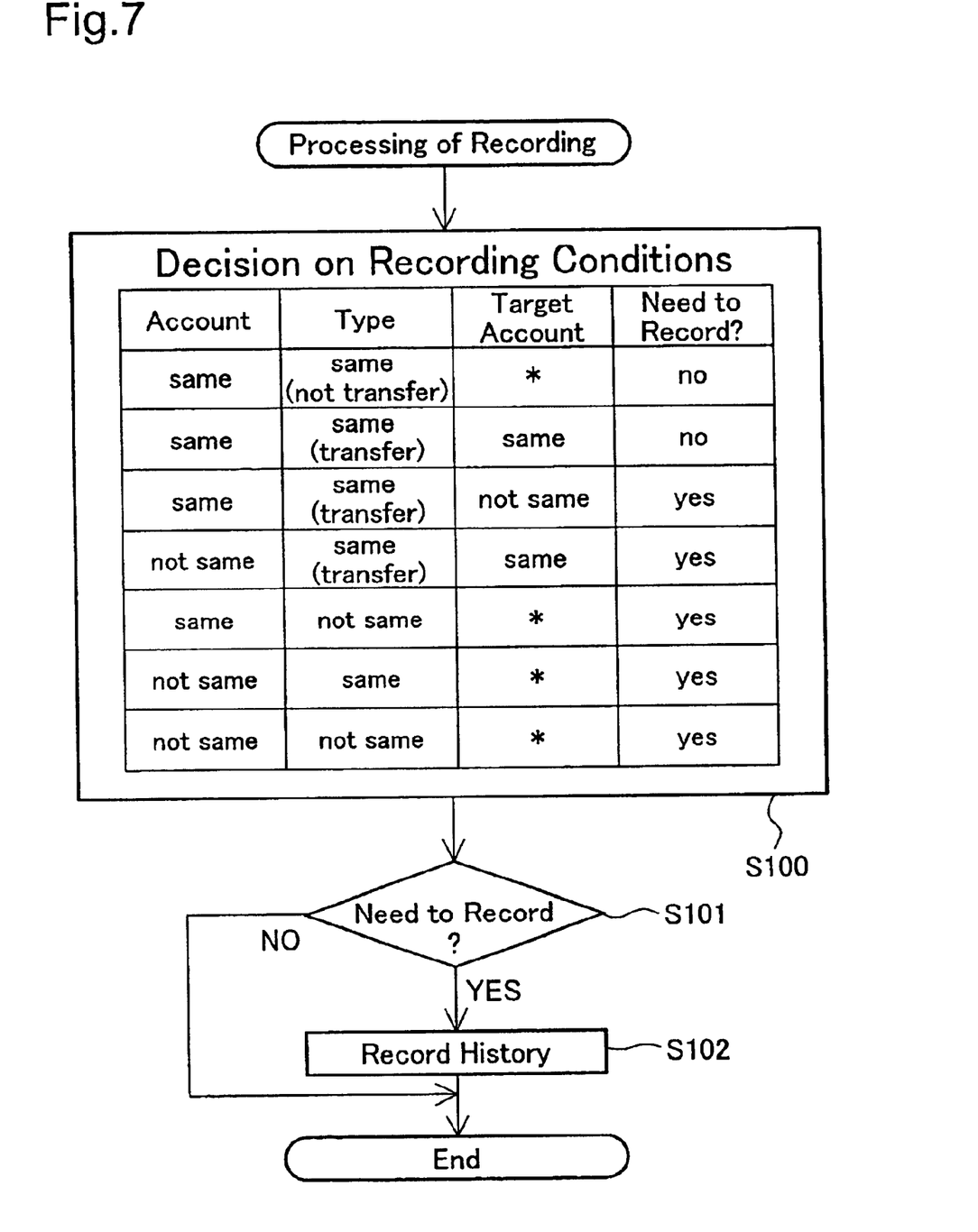
FIG. 7 is a flowchart of the processing of recording.

FIG. 7 is a flowchart of the processing of recording. The processing is to record the transaction history into the IC card upon the completion of each transaction, and is executed by the control unit 120.

When the processing is started, the control unit 120 determines whether or not the details of the transaction conducted by the user is to be recorded (step S100). The conditions for the recording are previously set as follows. If the user-conducted transaction is other than a transfer, and both the account and the type of the transaction coincide with those in the transaction history recorded in the IC card, the transaction is not to be recorded. If the user-conducted transaction is a transfer, and all the account, the type, and the target account of the transaction coincide with those in the transaction history recorded in the IC card, the transaction is not to be recorded for recording. If any one of the accounts or the target accounts described above differs from the accounts that are already recorded, the transaction is to be recorded. If at least one of the account and the type of the used-conducted transaction differs from those in the transaction history recorded in the IC card, the transaction is to be recorded.

The control unit 120 then targets the transaction details determined to be recordable in step S100 for recording in step S101. The conditions for determining the need of recording are not restricted to those illustrated herein, but may be set in various ways, too. A condition regarding the empty space of an IC chip may be provided, for example, in addition to the above conditions.

The control unit 120 records the transaction details into the history in step 102 if it is determined to be the target of recording in step S100, or skips the step if the transaction details needs no recording and ends the processing.

Although the control unit 120 determines the need of recording in the present embodiment, other configurations are also possible, e.g., the operation module 103 may present the transaction details as the candidates for recording and ask the user whether or not the recording is necessary for each of them. Alternatively, the user may create arbitrarily the transaction details that are desirable to present as a transaction menu and record them, instead of the transaction history.

According to the ATM 100 of the first embodiment described above, the user can display as a transaction menu the transaction history that covers more than one account. The user can also edit the transaction menu in a flexible way to conduct the transaction. This improves the convenience in transactions that use more than one account.

B. Second Embodiment

B1. Mode of Recording

Figure 8:
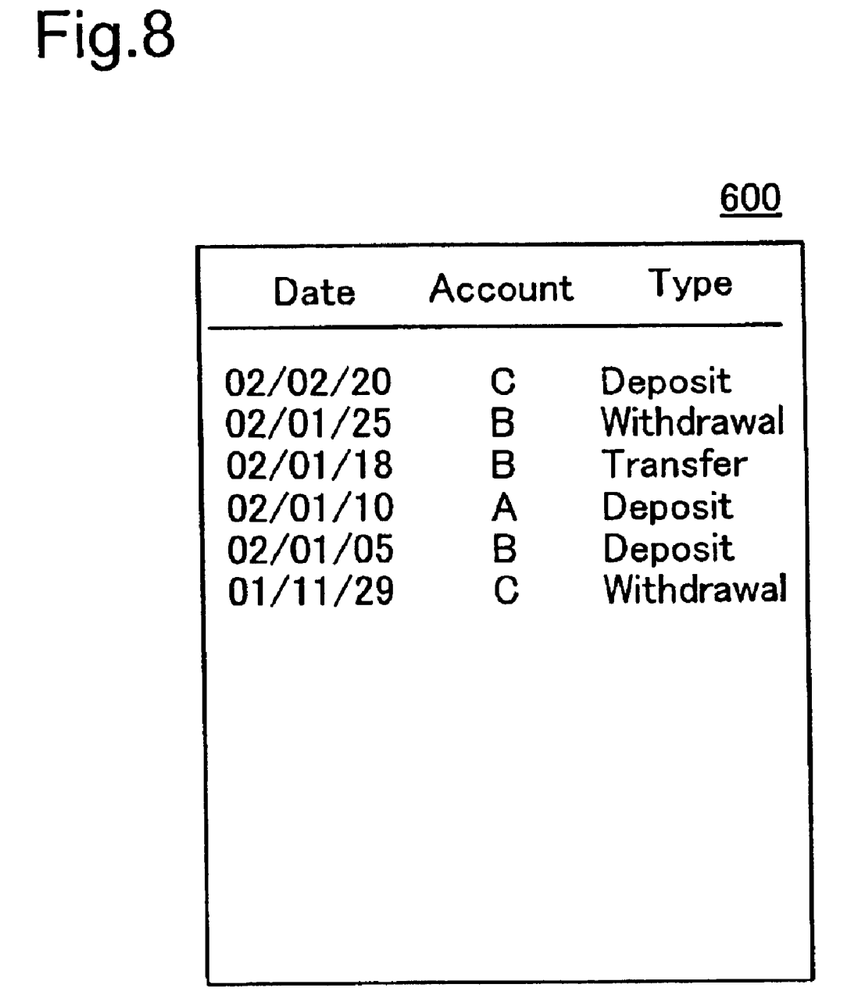
FIG. 8 is a schematic that shows a frame format of a transaction history recorded in IC chips.

FIG. 8 is a schematic that shows a frame format of a transaction history 600 recorded in IC chips. The IC chips record account information of more than one account as well as a transaction history covering those accounts.

In a second embodiment, the transaction history 600 records transaction information with a part of the information having been omitted. The transaction history 600 records the information useful for a transaction history menu. In the present embodiment, the transaction history 600 is recorded in an IC card. In the second embodiment, the history of card-using transactions is recorded. The history of transactions conducted without using the card, such as charges, is not recorded.

The transaction history 600 records the transaction information with the omissible transaction information having been omitted. In the present embodiment, items such as a transaction amount and a remaining amount are omitted from recording.

The processing of transactions in the second embodiment is similar to that in the first embodiment, except that the initial window displays no amount on the transaction history menu 401. Selecting an item from the transaction history menu 401 can display the window shown in FIG. 6B, so that a user can input an amount and execute a transaction.

According to the automatic transaction machine in the second embodiment, the recording area of the IC chips can be used effectively by recording the transaction information with a part of the information having been omitted.

C. Modifications

The first and the second embodiment illustrate the example configurations of the so-called ATMs placed in e.g., financial institutions. A client computer on a network is applicable as the automatic transaction machine of the present invention.

Figure 9:
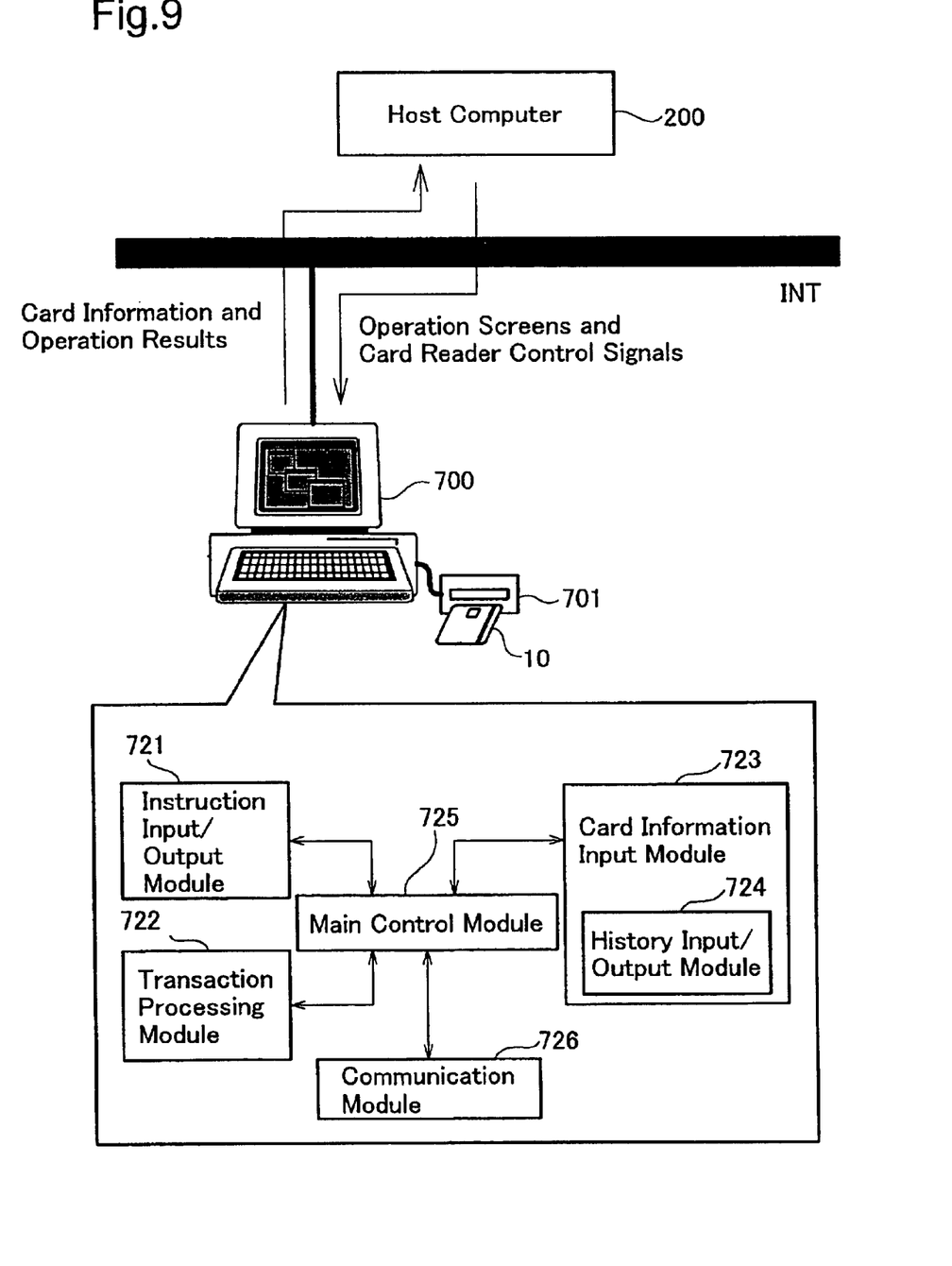
FIG. 9 is a schematic that shows the configuration of an automatic transaction machine 700 as a modification.

FIG. 9 is a schematic that shows the configuration of an automatic transaction machine 700 as a modification. The automatic transaction machine 700 is configured as a client computer connected to the Internet INT. The automatic transaction machine 700 implements various transactions by supplying and receiving information to and from a host computer 200 of a financial institution.

The automatic transaction machine 700 can be configured by installing an agent software into a general-purpose personal computer equipped with network interface card. A card reader 701 is connected with the client computer to read information from a card 10 mounted with IC chips. A passbook operation mechanism may be connected alternatively.

The client computer is installed with a browser for browsing a Web page created by e.g., HTML. The input and the output operation of the automatic transaction machine, accordingly, are implemented via the Web page provided from the host computer. The information from the client computer to the host computer 200 includes information read from the card 10 and various transaction-related operation results such as a designation of an account or an amount. The information from the host computer 200 to the client computer includes as follows: Web page data to provide operation windows; and control signals to control the operation of the card reader 701.

Similar to those shown in FIG. 2, the automatic transaction machine 700 is configured with functional blocks: a instruction input/output module 721; a transaction processing module 723; a card information input module 723; a history input/output module 724; a main control module 725; a communication module 726 all in a software manner. The functions implemented by each functional block are similar to those in the first embodiment (FIG. 1).

The designation input/output module 721, for example, presents a window for operation by a Web page data and inputs the operation results based on operations such as clicking a mouse. The designation input/output module 721 also displays a transaction history recorded in the history input/output module 724. The history input/output module 724 may input the transaction history from the IC card 10, and may also download from the host computer 200 as appropriate.

The above-described embodiment may be applicable to online trading or online shopping that conducts transactions with plural financial institutions or shops. The embodiments may also be applicable to administrative procedures that involve no transfer of money, such as the acquisition of certificates of residence.

Although the transactions that use the transaction history covering more than one account are illustrated in the above embodiments, a transaction history covering a single account may also be used. Although the transaction histories for more than one account are mixed and displayed as a menu in the above embodiments, it is also possible to select an account and display the corresponding transaction history only.

Although an IC card is used to record the transaction history in the above embodiments, a host computer may be used instead. In the latter case, an automatic transaction machine may communicate with the host computer to obtain the transaction history there from, thereby displaying it as a transaction menu.

Although various embodiments of the present invention are described above, it is clearly understood that the present invention is not restricted to the above embodiments, but there may be various configurations without departing from the spirit of the present invention. The processing of control described above may be implemented not only in a software manner but also in a hardware manner.

According to the present invention, a past transaction history that covers more than one account can be checked all at once. Additionally, using a transaction history as a transaction menu can simplify designations of an account and a transaction type at the time of a transaction is conducted. This improves the convenience in transactions using more than one account.

What is claimed is:

1. An automatic transaction machine that executes transactions according to operations by a user, comprising:
   a history input module that inputs a transaction history associated with said user;
   a presentation module that presents said transaction history as a transaction menu to said user;
   an instruction module that inputs a selection of a transaction from said transaction history and an edit instruction to edit one or more items of details of said selected transaction; and
   a transaction execution module that executes a transaction based on said selection and said edit instruction.

2. The automatic transaction machine according to claim 1, wherein:
   said transaction history includes detailed items for each of a plurality of transactions; and
   said edit instruction includes an instruction to edit one or more of said items.

3. The automatic transaction machine according to claim 1, wherein said presentation module presents said transaction history with some of said one or more items of said selected transaction left in blank; and said edit instruction includes a fill-in operation to fill information in said some of said one or more items that are left in blank.

4. The automatic transaction machine according to claim 1, wherein said transaction history includes information related to at least one of details of each transaction and account information associated with each transaction, and omits information subject to said edit instruction.

5. The automatic transaction machine for use with a history retention module and executing transactions on accounts of a user according to operations by said user, the automatic transaction machine comprising:
   a transaction execution module that executes a transaction according to operations by said user;
   a history input module configured to input a transaction history associated with said user from the history retention module, wherein the transaction history includes information related to a type and an account associated with each of a plurality of transactions; and
   a history output module that outputs information related to said executed transaction to said history retention module if at least one of the type and the account of said executed transaction does not match any entry of said input transaction history;
   wherein said history output module outputs information relating to an account associated with the executed transaction.

6. The automatic transaction machine according to claim 5, wherein said history retention module includes a portable recording medium.

7. An automatic transaction machine that executes transactions on accounts of a user according to operations by said user, comprising:
   a card information input module that reads information stored in an IC card that contains information related to multiple accounts;
   an operation module that displays a transaction history menu and a general transaction menu on a display screen, wherein a transaction history of the multiple accounts read by said card information input module is selected from the transaction history menu, and a transaction type, either withdrawal or transfer, is selected from the general transaction menu; and
   a main control module that executes transactions based on account information that is contained in at least one of the selected transaction history and the transaction type, either withdrawal or transfer, when the transaction history of one of the multiple accounts is selected from said transaction history menu through the operation module.

8. An automatic transaction machine according to claim 7, wherein said main control module, responsive to the transaction history being selected from said transaction history menu, displays a screen on said operation module to solicit input regarding whether at least one of account information, the transaction type or a transaction amount associated with the selected transaction history needs to be edited for a new transaction, before the main control module executes the transaction based on the selected transaction history.

9. An automatic transaction machine according to claim 7, wherein said main control module executes either a withdrawal operation or a transfer operation in response to the input account information and transaction amount, when the transaction type is selected from said transaction history menu through the operation module.

* * * * *